United States Patent
Chitlur et al.

(10) Patent No.: US 7,617,363 B2
(45) Date of Patent: Nov. 10, 2009

(54) LOW LATENCY MESSAGE PASSING MECHANISM

(75) Inventors: Nagabhushan Chitlur, Portland, OR (US); Linda J. Rankin, Portland, OR (US); David S. Dunning, Portland, OR (US); Maruti Gupta, Portland, OR (US); Hongbin (Michael) Liao, Haidian District (CN)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 11/236,386

(22) Filed: Sep. 26, 2005

(65) Prior Publication Data

US 2007/0073976 A1 Mar. 29, 2007

(51) Int. Cl.
*G06F 12/08* (2006.01)
*G06F 15/163* (2006.01)
(52) U.S. Cl. .................. 711/135; 709/212; 711/121
(58) Field of Classification Search .................. None
See application file for complete search history.

(56) References Cited

U.S. PATENT DOCUMENTS 5,579,503 A * 11/1996 Osborne .............. 711/119
5,764,896 A    6/1998 Johnson
6,141,344 A    10/2000 DeLong
6,675,316 B1   1/2004 Harper

FOREIGN PATENT DOCUMENTS

WO    WO 02/084501 A    10/2002

OTHER PUBLICATIONS

International Search Report and Written Opinion, International Application No. PCT/US2006/037633, mailed Mar. 5, 2007, 11 pages.
International Preliminary Report on Patentability, International Application No. PCT/US2006/037633, mailed Apr. 3, 2008, 7 pages.
Office Action received for CN Patent Application No. 200680035108.8 mailed on Jun. 5, 2009, 7 pages and English translation of 14 pages.

* cited by examiner

*Primary Examiner*—Gary J Portka
(74) *Attorney, Agent, or Firm*—Grossman, Tucker, Perreault & Pfleger, PLLC (57) ABSTRACT

In one embodiment, a method is provided. The method of this embodiment provides detecting by a network controller a flush occurring on a host bus of a DM ("direct messaging") packet to a memory from a first cache line associated with a first processor; obtaining and storing the DM packet at a second cache line associated with the network controller; and sending the DM packet over a network to a third cache line associated with a second processor.

20 Claims, 8 Drawing Sheets

LOW LATENCY MESSAGE PASSING MECHANISM

PRIORITY INFORMATION

1. Field

Embodiments of this invention relate to low latency message passing.

2. Background

An application on a first computing platform may exchange messages with an application on a second computing platform. As used herein, a message refers to a piece of information sent from one application to another over a communication channel. For example, some messages may be requests made to one application by another, and other messages may deliver data or notification to another application.

In application-to-application message passing, a first application on a first platform may pass a message to a second application on a second platform using packets. At the first platform, the first application may employ a host processor to generate a message. The message may be placed in main memory, where a NIC may generate a packet containing the message, and may transfer the packet over the communication channel. At the second platform, the packet may be received by a network controller, and the network controller may process the packet and write the message to main memory. The second application may employ the host processor to read the message from main memory.

Message passing according to traditional methods may necessitate undesired latencies. These latencies include hardware latencies, such as writes to and from main memory, as well as software latencies, such as packet processing. These latencies may be further compounded in certain computing environments, such as clustered computing because, for example, a large number of latency-critical messages may be exchanged between the different computing nodes.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

In one example of an embodiment, a transmitting application may generate a DM ("direct messaging") packet, and place it in a processor transmit cache at cache line DMTX ("direct messaging transmit"). The transmitting application may flush the cache line out to memory at address DMTX. Upon observing the flush of cache line DMTX, a DM-NC ("direct messaging network controller") may store the DM packet in a network controller transmit cache at cache line DMTX. DM-NC may forward all or part of the cache line to a network (e.g., via a MAC, or media access controller, interface) without modification.

In another example of an embodiment, a packet may be received from a network (e.g., on a network MAC interface), where the DM-NC may read a type field of the header. Upon determining that the packet is a DM packet, the DM-NC may store the DM packet in a network controller receive cache at cache line DMRX ("direct messaging receive"). DM-NC may issue a bus invalidate command for address DMRX on host bus. Since cache line DMRX has been evicted from its cache, a receiving application polling on this cache line may be forced to read the data from address DMRX from memory. DM-NC may detect the read to address DMRX and may provide the DM packet by transferring the data directly to processor receive cache at address DMRX.

As used herein, "DM packet" refers to a packet that may bypass traditional packet protocol processing (e.g., by a standard system software stack and network controller driver) and memory transfers. In an embodiment, a DM packet may be transmitted from one application to another application using caches. A DM packet may comprise payload and a physical layer header (e.g., Ethernet header). In an embodiment, a DM packet may additionally comprise flow control bits to implement packet ordering algorithms and policies. In an embodiment, DM packet may conform to the Ethernet standard. As used herein, a "packet" means a sequence of one or more symbols and/or values that may be encoded by one or more signals transmitted from at least one sender to at least one receiver.

As used herein, a "DM-NC" refers to a network controller that is direct messaging enabled. In at least one embodiment, a network controller that is direct messaging enabled means that the network controller is communicatively coupled to a host bus rather than a local bus, and may further process DM packets.

Embodiments of the invention are in no way limited to the components, protocols, and/or other details of the examples provided herein. For example, while the Ethernet standard may be used in certain embodiments, embodiments of the invention are not limited to this protocol, and in fact, other interconnect technologies may be used. The Ethernet standard is a LAN (local area network) technology. It is described in, for example, Institute of Electrical and Electronics Engineers, Inc. (IEEE) Std. 802.3, 2002 Edition, current edition published on Mar. 8, 2002.

Figure 1:
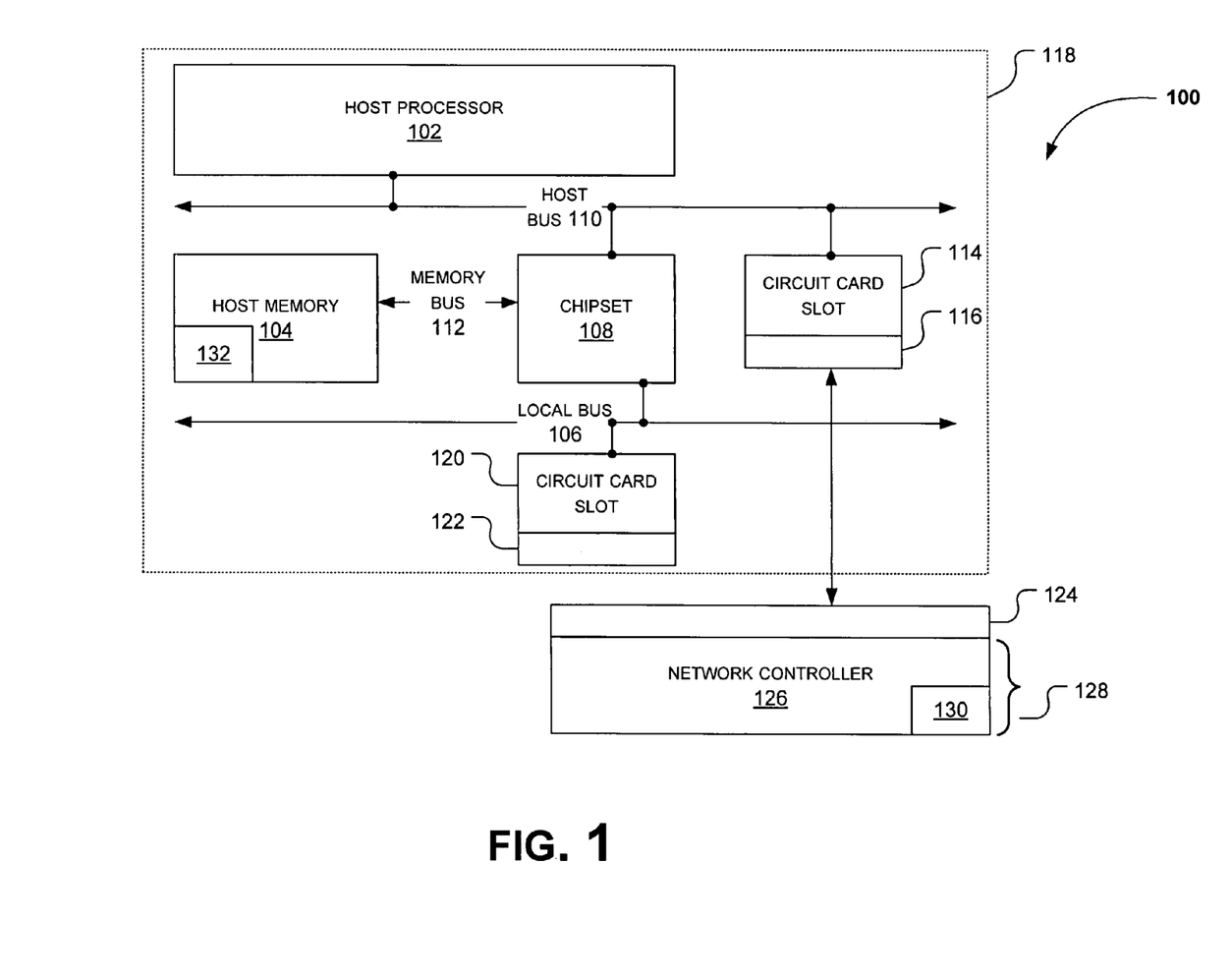
FIG. 1 illustrates a system according to one embodiment.

One or more methods described herein may be performed on a system such as system 100 as illustrated in FIG. 1. Host processor 102 may comprise, for example, an Intel® Pentium® microprocessor that is commercially available from the Assignee of the subject application. Of course, alternatively, host processor 102 may comprise another type of microprocessor, such as, for example, a microprocessor that is manufactured and/or commercially available from a source other than the Assignee of the subject application, without departing from this embodiment.

Memory 104 may store machine-executable instructions 132 that are capable of being executed, and/or data capable of being accessed, operated upon, and/or manipulated by logic, such as logic 130. Memory 104 may, for example, comprise read only, mass storage, random access computer-accessible memory, and/or one or more other types of machine-accessible memories. The execution of program instructions 132 and/or the accessing, operation upon, and/or manipulation of this data by logic 130 for example, may result in, for example, system 100 and/or logic 130 carrying out some or all of the operations described herein.

Chipset 108 may comprise a host bridge/hub system that may couple host processor 102, and host memory 104 to each other and to local bus 106. For example, chipset 108 may comprise an I/O (input/output) chipset or a memory chipset. Alternatively, host processor 102 and host memory 104 may be coupled directly to bus 106, rather than via chipset 108. Chipset 108 may comprise one or more integrated circuit chips, such as those selected from integrated circuit chipsets commercially available from the Assignee of the subject application (e.g., graphics, memory, and I/O controller hub chipsets), although other one or more integrated circuit chips may also, or alternatively, be used. Chipset 108 may communicate with memory 104 via memory bus 112 and with host processor 102 via host bus 110.

Host bus 110 may be coupled to a circuit card slot 114 having a bus connector 116, and local bus 106 may be coupled to a circuit card slot 120 having a bus connector 122. Host bus 110 and local bus 106 may comprise a parallel bus interface, or a serial bus interface. For example, host bus 110 may comprise a Coherent System Interconnect (CSI) bus, and local bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Bus 106 may comprise other types and configurations of bus systems.

Rather than being coupled to a local bus, such as local bus 106, network controller 126 may be coupled to host bus 110. Consequently, network controller 126 may monitor and/or fetch transactions from host bus 110. Network controller 126 may be comprised in a circuit card 128 (e.g., NIC or network interface card that may be inserted into a circuit card slot 114. Network controller 126 may comprise logic 130 to perform operations described herein as being performed by network controller 126 and/or system 100. Circuit card slot 114 may comprise, for example, a PCI expansion slot that comprises a PCI bus connector 116. PCI bus connector 116 may be electrically and mechanically mated with a PCI bus connector 124 that is comprised in circuit card 128. Circuit card slot 114 and circuit card 128 may be constructed to permit circuit card 128 to be inserted into circuit card slot 114. When circuit card 128 is inserted into circuit card slot 114, PCI bus connectors 116, 124 may become electrically and mechanically coupled to each other. When PCI bus connectors 116, 124 are so coupled to each other, logic 130 in circuit card 128 may become electrically coupled to host bus 110. Rather than reside on circuit card 128, network controller 126 may instead be comprised on system motherboard 118. Alternatively, network controller 126 may be integrated onto chipset 108. However, embodiments of the invention are not limited to these configurations.

Logic 130 may comprise hardware, software, or a combination of hardware and software. For example, logic 130 may comprise circuitry (i.e., one or more circuits), to perform operations described herein. Logic 130 may be hardwired to perform the one or more operations. For example, logic 130 may comprise one or more digital circuits, one or more analog circuits, one or more state machines, programmable logic, and/or one or more ASIC's (Application-Specific Integrated Circuits). Alternatively or additionally, logic 130 may be embodied in machine-executable instructions 132 stored in a memory, such as memory 104, to perform these operations.

System 100 may comprise more than one, and other types of memories, buses, and network controllers; however, those illustrated are described for simplicity of discussion. Host processor 102, memory 104, and busses 106, 110 may be comprised in a single circuit board, such as, for example, a system motherboard 118, but embodiments of the invention are not limited in this respect.

Figure 2:
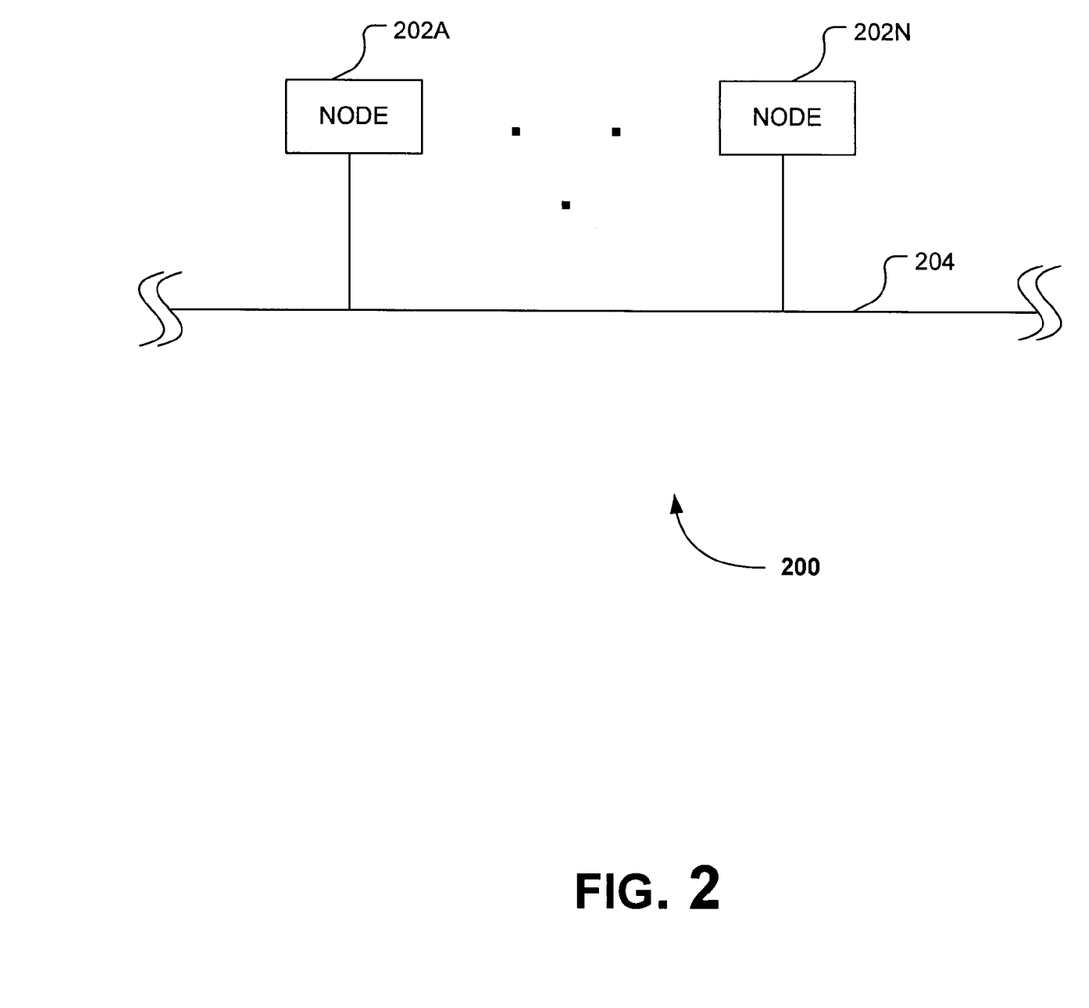
FIG. 2 illustrates a network.

As shown in FIG. 2, system 100 may operate in a network 200. Network 200 may comprise a plurality of nodes 202A, . . . 202N. One or more nodes 202A, . . . , 202N may comprise system 100, and may be communicatively coupled together via a communication medium 204.

As used herein, components that are "communicatively coupled" means that the components may be capable of communicating with each other via wirelined (e.g., copper or optical wires), or wireless (e.g., radio frequency) means.

As used herein, a "communication medium" means a physical entity through which electromagnetic radiation may be transmitted and/or received. Communication medium 204 may comprise, for example, one or more optical and/or electrical cables, although many alternatives are possible. For example, communication medium 204 may comprise, for example, air and/or vacuum, through which nodes 202A . . . 202N may wirelessly transmit and/or receive sets of one or more signals.

Furthermore, nodes 202A . . . 202N may transmit and receive sets of one or more signals via medium 204 that may encode one or more packets. In network 200, one or more of the nodes 202A . . . 202N may comprise one or more intermediate stations (not shown), such as, for example, one or more hubs, switches, and/or routers; additionally or alternatively, one or more of the nodes 202A . . . 202N may comprise one or more end stations. Communication medium 204 may communicatively couple together at least some of the nodes 202A . . . 202N and one or more of these intermediate stations. Of course, many alternatives are possible.

Figure 3:
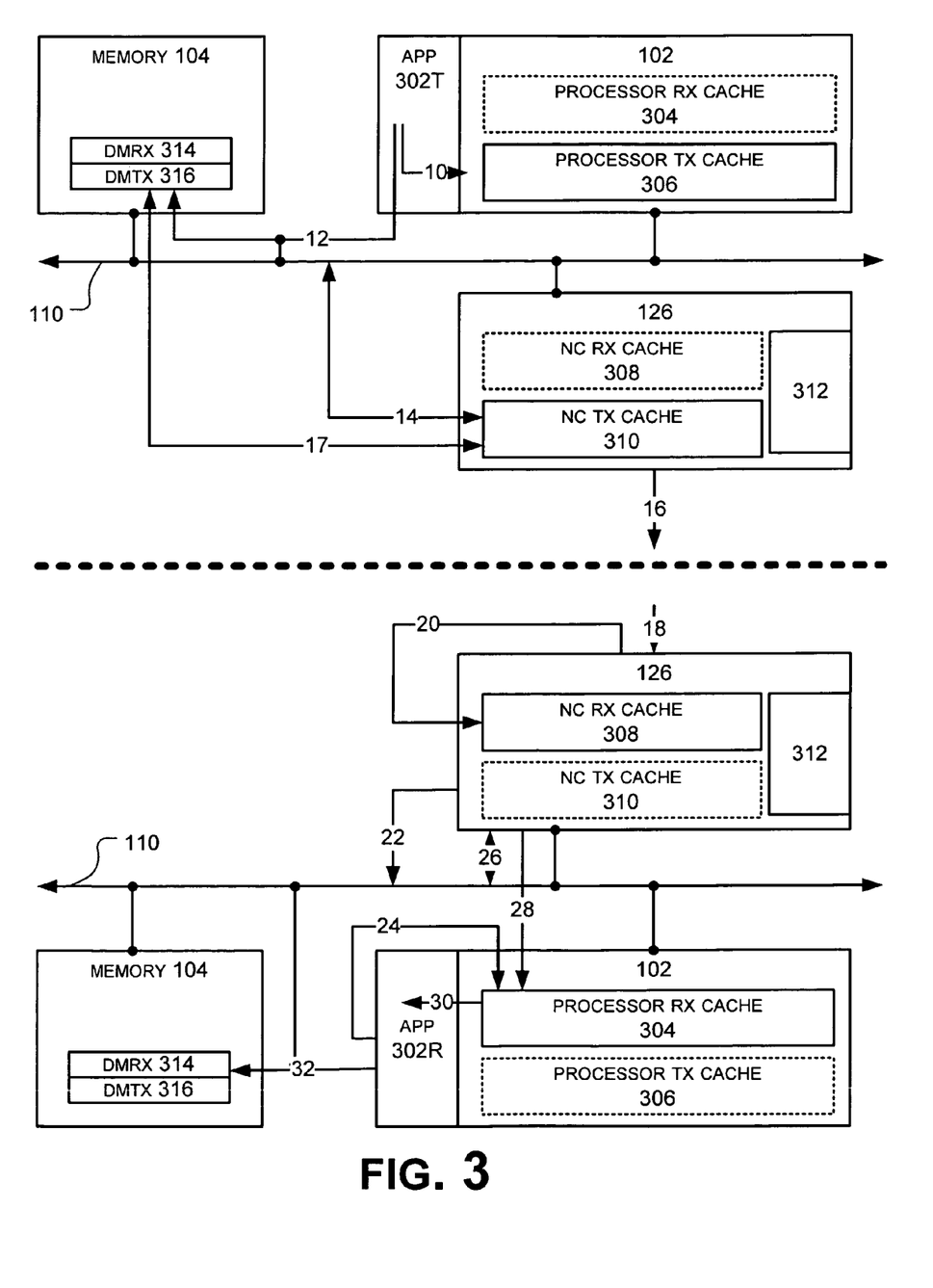
FIG. 3 illustrates a system in further detail according to one embodiment.

As illustrated in FIG. 3, memory 104 may comprise direct messaging receive address ("DMRX") 314, and direct messaging transmit address ("DMTX") 316; processor 102 may be communicatively coupled to host bus 110, and may comprise processor receive ("RX") cache 304 and processor transmit ("TX") cache 306; network controller 126 may also be communicatively coupled to host bus 110, and may comprise network controller receive ("NC RX") cache 304, network controller transmit ("NC TX") cache 306, and register 312; and a transmitting application 302T, and a receiving application 302R stored in memory 104 may be executed by processor 102. As used herein, a direct messaging transmit (DMTX) address and a direct messaging receive (DMRX) address each refers to an address in a memory, and corresponds to a cache line in a caching agent, and may be used in cache transactions as described herein.

Processor 102 and network controller 126 may each additionally operate as a caching agent. Consequently, in an embodiment, each may participate in a cache coherency protocol to track state of cache lines. For example, processor 102 and network controller may each participate in the MESI (Modified, Exclusive, Shared, Invalid) cache coherency protocol. The MESI cache coherency protocol may be used to indicate one of four states of a cache line as follows:

Modified: entry in this cache only is valid; memory is not up to date.

Exclusive: no other cache has this cache line; memory is up to date.

Shared: other caches have this cache line; memory is up to date.

Invalid: cache line does not contain valid data. In embodiments of the invention, this may enable the associated cache line to be reused.

Embodiments of the invention are not limited to the MESI protocol. For example, other coherency protocols may be used, including MESIF (Modified, Exclusive, Shared, Invalid and Forward) cache coherency protocol, and MOESI (Modified, Owned, Exclusive, Shared, Invalid) cache coherency protocol. Other coherency protocols may be used without departing from embodiments of the invention.

Figure 4:
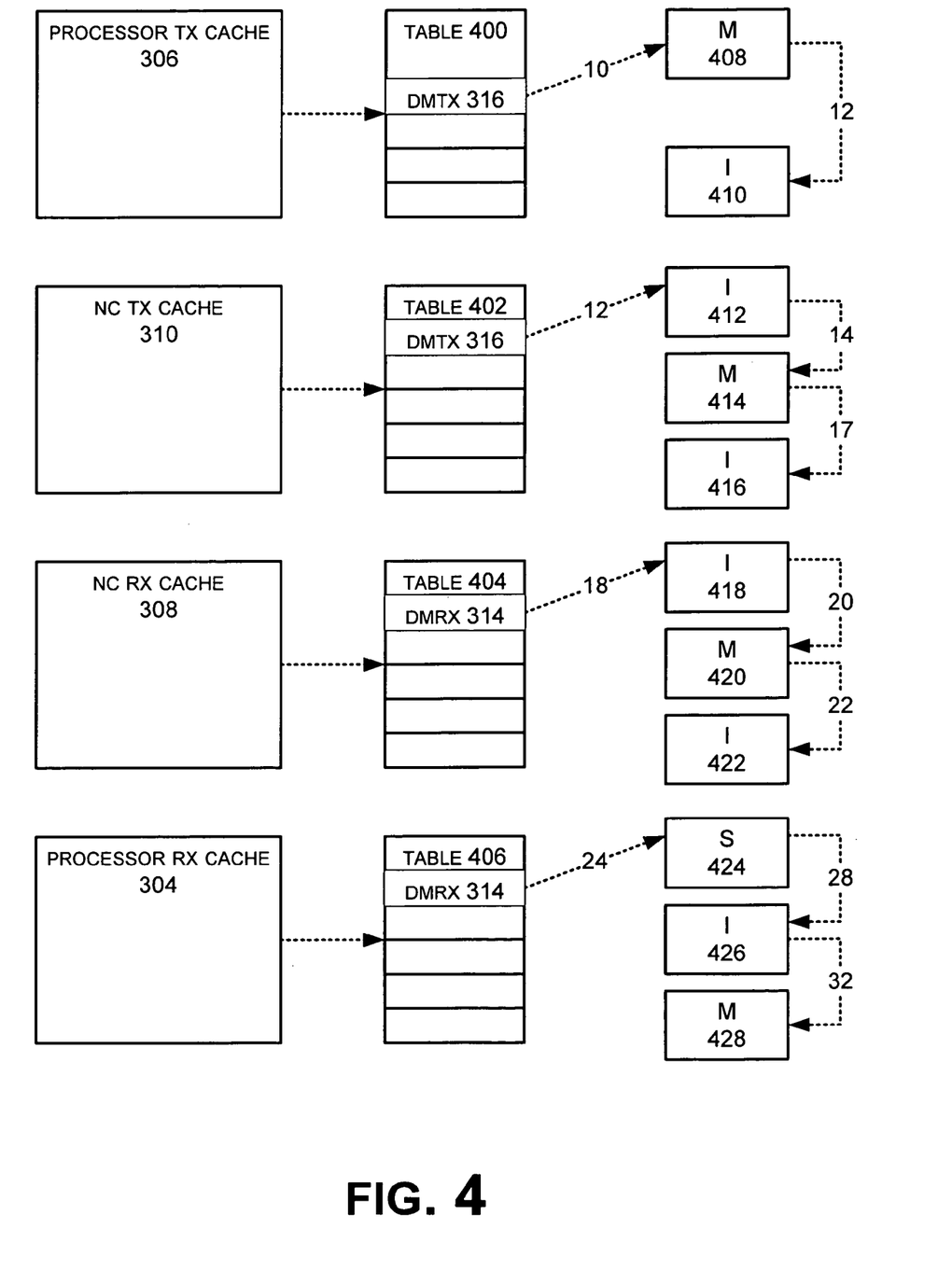
FIG. 4 illustrates example cache coherency tables and states according to one embodiment.

For example, state of cache lines may be tracked using coherency tables 402, 404, 406, 408 as illustrated in FIG. 4. For example, each table 402, 404, 406, 408 may maintain information for one or more cache lines each corresponding to an address in memory 104, including state of the cache line at that address. In this example, each cache coherency table 402, 404, 406, 408 indicates an initial state 408, 412, 418, 424. One or more subsequent states 410, 414, 416, 420, 422, 426, 428 are also illustrated and are described below.

Figure 5:
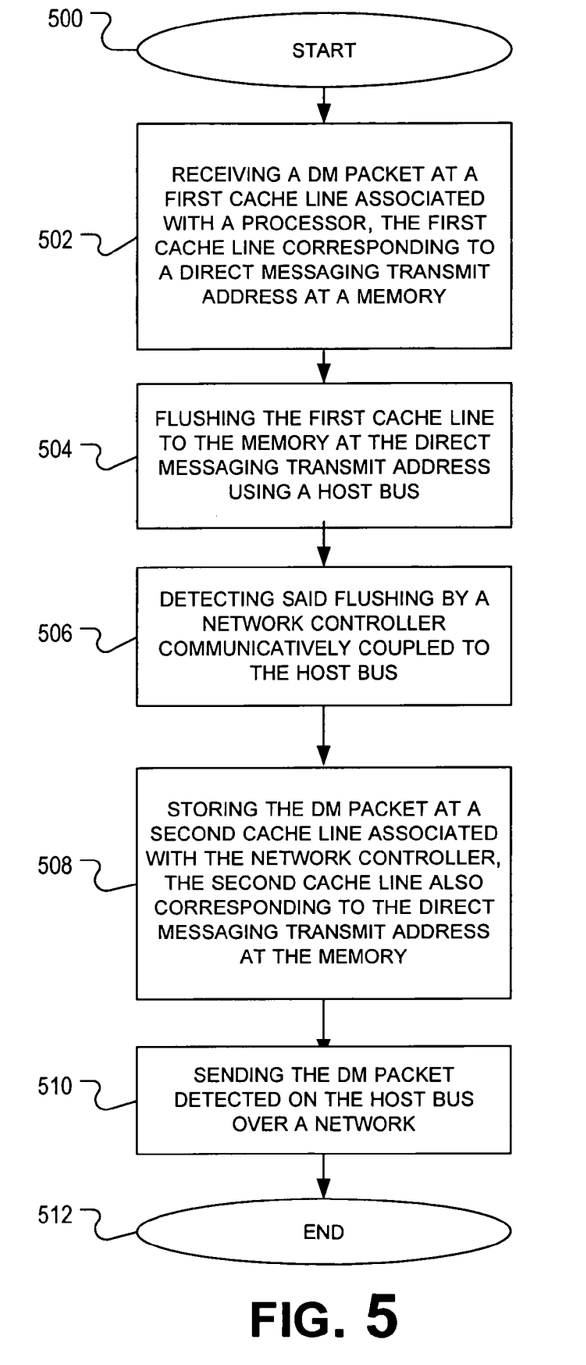
FIG. 5 is a flowchart illustrating a method according to one embodiment.

FIG. 5 illustrates a method according to an embodiment of the invention. In an embodiment, the method of FIG. 5 may be performed by system 100. The method of FIG. 5 may begin at block 500. At block 502, the method may comprise receiving a DM packet at a first cache line associated with a processor, the first cache line corresponding to a direct messaging transmit address at a memory. For example, the DM packet may be transmitted by transmitting application 302T, and the first cache line may be associated with processor 102, and may correspond to address DMTX 316 at memory 104.

At block 504, the method may comprise flushing the first cache line to the memory at the direct messaging transmit address using a host bus. For example, application 302T may flush the first cache line to memory 104 at address DMTX 316 (12) using host bus 110. In an embodiment, flushing a cache line means to copy the content of that cache line to another area, e.g., for the purpose of maintaining coherency, although embodiments of the invention are not limited by this. Address DMTX 316 may be set up by a network controller driver. For example, a network controller driver may set up a connection between two nodes by initializing register 312 with address DMTX 316.

Referring to FIG. 4, for cache coherency table 400, subsequent to (10) and prior to (12), data (i.e., the DM packet) at cache line DMTX in processor TX cache 306A may be current, and state of this cache line may be "M" 408. Subsequent to (12), data at cache line DMTX in processor TX cache 306A may be invalid, and state of this cache line may transition to "I" 410. The "I" status may indicate that the cache line may now be reused.

At block 506, the method may comprise detecting said flushing by a network controller communicatively coupled to the host bus. For example, the flush may be detected by network controller 126 communicatively coupled to host bus 110. Since network controller 126 is communicatively coupled to host bus 110, network controller 126 can watch for transactions occurring on host bus 110 (14). When a transaction is carried out on host bus 110, network controller 126 may determine if the transaction is a flush of address DMTX 316. For example, network controller 126 may do this by examining a "Request Field" of the transaction. If it is, network controller 126 may grab the packet from the host bus 110 (14).

At block 508, the method may comprise storing the DM packet at a second cache line associated with the network controller, the second cache line also corresponding to the direct messaging transmit address at the memory. For example, the DM packet may be stored at a cache line associated with network controller 126 (14), where the cache line also corresponds to address DMTX 316A.

At block 510, the method may comprise sending the DM packet over a network to a third cache line associated with a second processor. For example, the DM packet may be detected on host bus 110, and may be sent over a network (16). Furthermore, to indicate readiness to receive another packet from host processor 102, network controller 126 may flush the cache line to memory 104 (17). Network controller 126 may also update one or more control flags in cache line associated with address DMTX 316 prior to flushing the cache line to memory 104. This may enable transmitting application 302T to subsequently generate DM packets that contain updated flow control information.

The method may end at block 512.

Turning to cache coherency table 402, subsequent to (12) and prior to (14), data at cache line DMTX in NC TX cache 306A may be invalid, and state of this cache line may be "I" 412. Subsequent to (14), data at cache line DMTX in NC TX cache 306A may be current, and state of this cache line may transition to "M" 414. Subsequent to (17), data at cache line DMTX in NC TX cache 306A may be invalid, and state of this cache line may transition to "I" 416. The "I" status may indicate that the cache line may now be reused.

Figure 6:
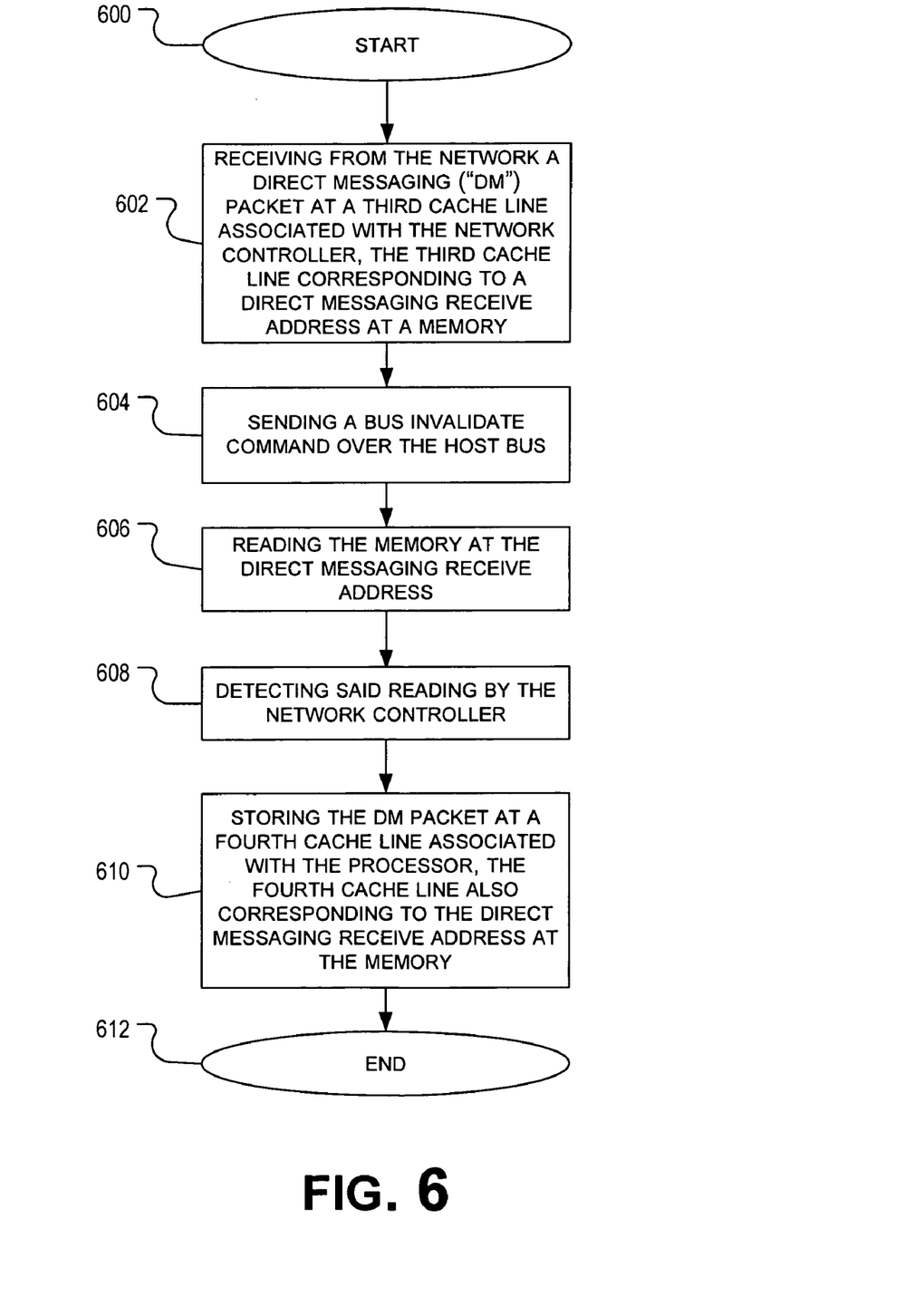
FIG. 6 is a flowchart illustrating a method according to one embodiment.

FIG. 6 illustrates another method according to an embodiment of the invention. In an embodiment, the method of FIG. 6 may also be performed by system 100. The method of FIG. 6 may begin at block 600 and continue to block 602 where the method may comprise receiving from the network a direct messaging ("DM") packet at a third cache line associated with the network controller, the third cache line corresponding to a direct messaging receive address at a memory.

In an embodiment, a DM packet may be received by a MAC interface of protocol implemented on network controller 126, and may be sent from a network controller transmit cache of another network controller. Furthermore, the DM packet may be received at a cache line (18, 20) associated with network controller 126, where the cache line may correspond to address DMRX 314 at memory 104 In an embodiment, a packet may be determined to be a DM packet by reading a type field of the packet header.

At block 604, the method may comprise sending a bus invalidate command over the host bus (22). The bus invalidate command may force receiving application 302R polling at address DMRX 314 to fetch data for cache line DMRX from memory 104. As used herein, a "bus invalidate command" refers to an instruction or signal, for example, that may force an application polling a cache line to retrieve data from a corresponding address in memory.

In cache coherency table 404 and prior to (20), data at cache line DMRX in NC RX cache 306X may be invalid, and state of this cache line may be "I" 418. Subsequent to (20), data at cache line DMRX in NC RX cache 306X may be modified, and state of this cache line may transition to "M" 420. Subsequent to (22), data at cache line DMRX in NC RX cache 306X may be invalid, and state of this cache line may transition to "I" 422. The "I" status may indicate that the cache line may now be reused. This may also ensure that the transfer happens only once, and that subsequent reads to address DMRX 314 do not result in responding with any data.

At block 606, the method may comprise reading the memory at the direct messaging receive address. In an embodiment, the bus invalidate command at block 604 may result in cache line DMRX being evicted from its cache (e.g., processor RX cache 304), thereby resulting in receiving application 302R polling on cache line DMRX (24) to instead fetch the data from address DMRX 314 in memory 104. Alternatively, address DMRX 314 at memory 104 may be read as a result of receiving application 302R monitoring commands on host bus 110. Address DMRX 314 may be set up by a network controller driver, for example. For example, network controller driver may set up a connection between two nodes by initializing register 312.

At block 608, the method may comprise detecting said reading by the network controller. In an embodiment, network controller 126 may detect the read on host bus 110 (26).

At block 610, the method may comprise storing the DM packet at a fourth cache line associated with the processor, the fourth cache line also corresponding to the direct messaging receive address at the memory. In an embodiment, the DM packet may be stored at a cache line associated with processor RX cache 304 of processor 102 (28), where the fourth cache line also corresponds to address DMRX 314 at memory 104. Furthermore, in an embodiment, the DM packet may be provided via a HITM# command on host bus 110. A HITM# command refers to a command that enables one caching agent to provide the latest data in response to a read transaction initiated by another caching agent.

In cache coherency table 406, subsequent to (24) and prior to (28), data at cache line DMRX in processor RX cache 304X may be shared, and state of this cache line of may be "S" 424. Subsequent to (28), data at cache line DMRX in processor RX cache 304X may be invalid, and state of this cache line may transition to "I" 426. The "I" status may indicate that the cache line may now be reused.

In an embodiment, DM packet in processor cache line may be processed by receiving application 302R, and application may retrieve the associated message. Subsequently, application may consume the DM packet (30), and may set a flow control bit to indicate that it is ready for the next packet. Receive application 302R may further flush address DMRX 314 to memory 104X (32). Network controller 126 may observe this flush, and may be ready for another packet.

In cache coherency table 406 and subsequent to (32), data at cache line DMRX in processor RX cache 304X may be modified, and state of this cache line may transition to "M" 428. The state of this cache line may remain at "M" for as long as receive application 302R deems necessary.

The method may end at block 612.

Figure 7:
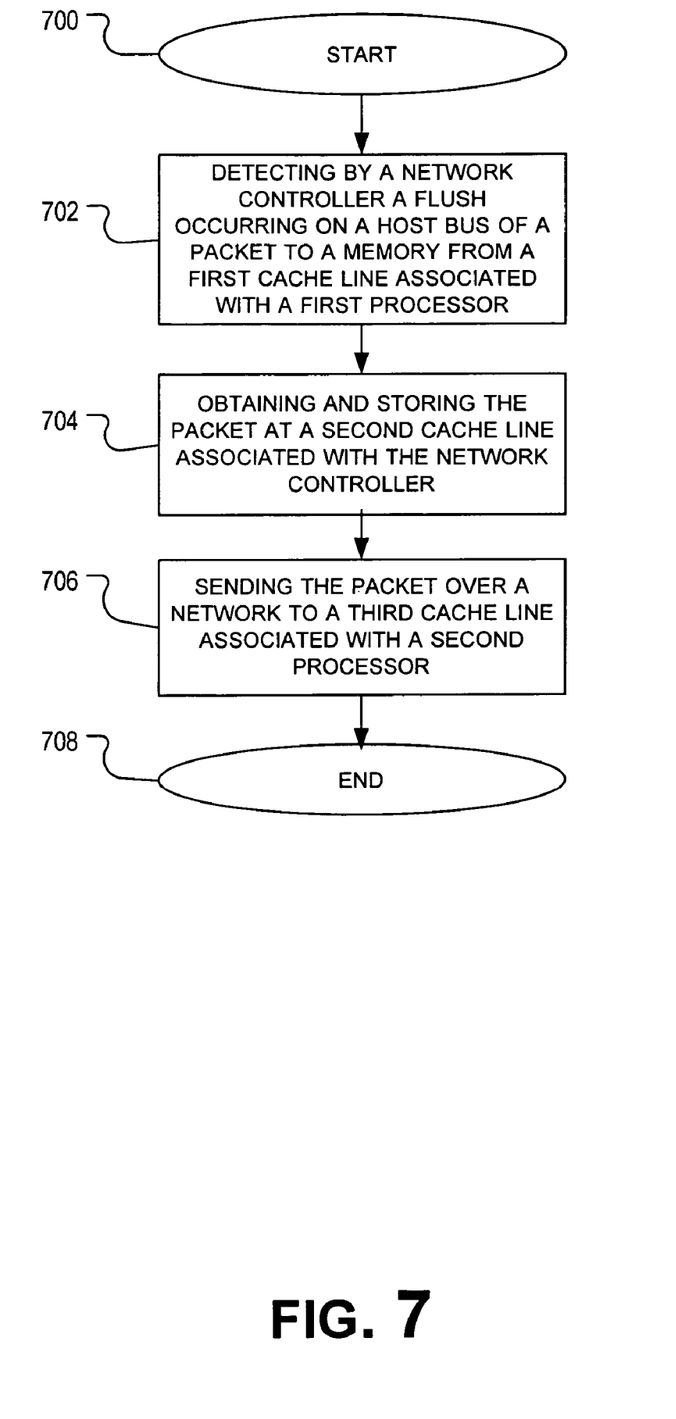
FIG. 7 is a flowchart illustrating a method according to another embodiment.

FIG. 7 illustrates a method in accordance with another embodiment of the invention. The method may begin at block 700 and continue to block 702 where the method may comprise detecting by a network controller a flush occurring on a host bus of a packet to a memory from a first cache line associated with a first processor. In an embodiment, network controller 126 may detect a flush on host bus 110 of a packet to memory 104 from a first cache line associated with processor 102. In an embodiment, first cache may correspond to address DMTX 316 in memory 104.

At block 704, the method may comprise obtaining and storing the packet at a second cache line associated with the network controller. In an embodiment, the packet may be stored at a cache line associated with network controller 126. Furthermore, in an embodiment, the cache line may correspond to address DMTX 316.

At block 706, the method may comprise sending the packet over a network to a third cache line associated with a second processor. In an embodiment, the packet may be sent over a network directly to a cache line at another processor.

The method may end at block 708.

Figure 8:
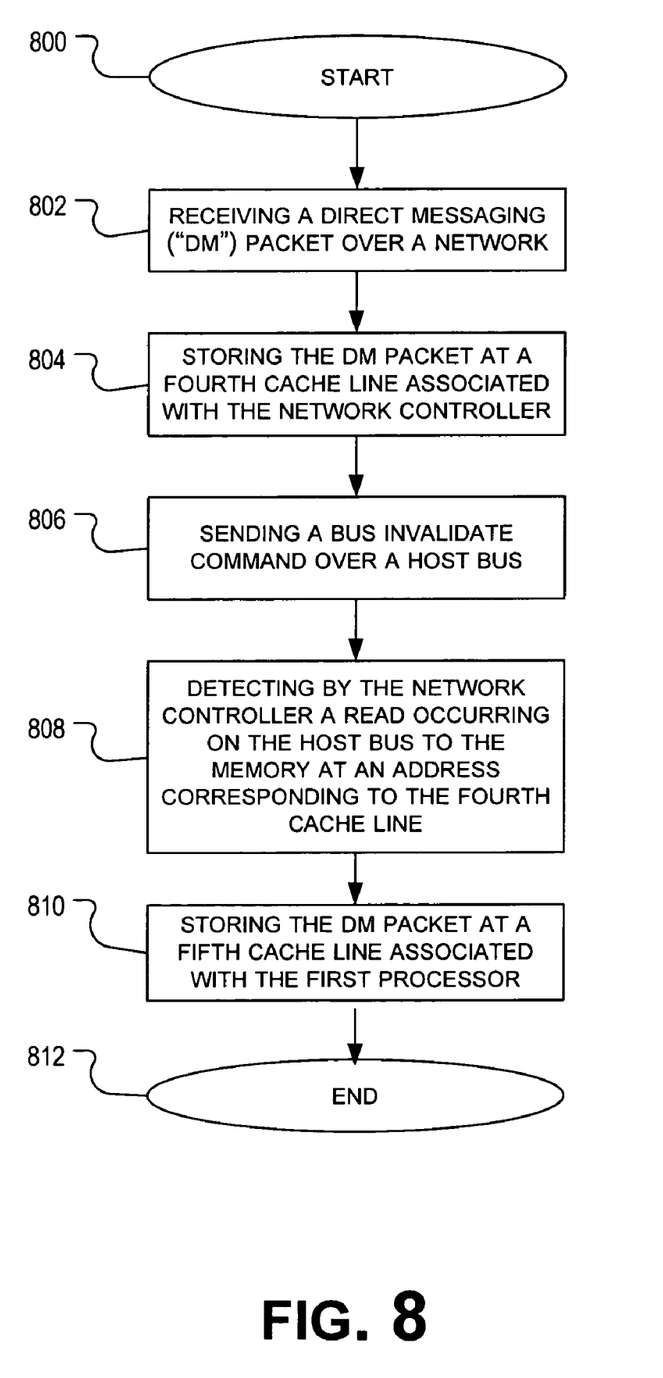
FIG. 8 is a flowchart illustrating a method according to another embodiment.

FIG. 8 illustrates a method in accordance with another embodiment of the invention. The method may begin at block 800 and continue to block 802 where the method may comprise receiving a direct messaging ("DM") packet over a network. In an embodiment, DM packet may be transmitted by a transmitting application on another system.

At block 804, the method may comprise storing the DM packet at a fourth cache line associated with the network controller. In an embodiment, the fourth cache line may be associated with network controller 126, and may correspond to address DMRX 314.

At block 806, the method may comprise sending a bus invalidate command over a host bus. In an embodiment, network controller 126 may send a bus invalidate command over host bus 110. In an embodiment, this may result in fourth cache line being evicted from its cache (e.g., processor RX cache 304), resulting in receiving application 302R reading data from DMRX 314 in memory 104.

At block 808, the method may comprise detecting by the network controller a read occurring on the host bus to the memory at an address corresponding to the fourth cache line. In an embodiment, network controller 126 may detect read occurring on host bus 110 to memory 104 at address DMRX 314. As explained above, this read may be from receiving application 302R reading data from DMRX 314 in memory 104 since fourth cache line was evicted from its cache.

At block 810, the method may comprise storing the DM packet at a fifth cache line associated with the first processor. In an embodiment, the DM packet may be stored at a cache line associated with processor 102. Furthermore, cache line may correspond to address DMRX 314.

The method may end at block 812.

CONCLUSION

Therefore, in one embodiment, a method may comprise detecting by a network controller a flush occurring on a host bus of a packet to a memory from a first cache line associated with a first processor; obtaining and storing the packet at a second cache line associated with the network controller; and sending the packet over a network to a third cache line associated with a second processor.

Embodiments of the invention may provide a low latency application to application message passing mechanism. By using caching network controllers, network controllers and processors on both a transmitting and receiving system may use cache coherency protocols to deliver packets from a cache on a transmitting system, and to receive data at a cache on a receiving system. An application on the receiving system may retrieve the associated message from the cache on the receiving system faster. Since retrieving data from a cache is faster than retrieving it from memory, message passing results in lower latency.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
   generating a direct messaging (DM) packet wherein the DM packet comprises a packet identifier configured to identify a packet as a DM packet, placing the DM packet in a first cache line associated with a first processor and flushing the DM packet to a host memory wherein the generating, placing and flushing is performed by an application running on the first processor;
   detecting by a network controller the flush occurring on a host bus, coupled to the first processor, of the DM packet to a host memory from the first cache line associated with the first processor;
   obtaining and storing the DM packet at a second cache line associated with the network controller; and
   sending the DM packet over a network to a third cache line associated with a second processor.

2. The method of claim 1, additionally comprising:
   receiving a DM packet over the network at a fourth cache line associated with the network controller;
   sending a invalidate command over a host bus;
   detecting by the network controller a read occurring on the host bus to the memory at an address corresponding to the fourth cache line; and
   in response to said detecting, storing the DM packet at a fifth cache line associated with the first processor.

3. The method of claim 2, wherein the network controller is communicatively coupled to the host bus.

4. The method of claim 3, wherein the read occurring on the host bus is in response to the network controller sending a bus invalidate command.

5. A method comprising:
   generating a direct messaging (DM) packet wherein the DM packet comprises a packet identifier configured to identify a packet as a DM packet, providing the DM packet to a first cache line associated with a first processor wherein the generating and providing is performed by an application running on the first processor;
   receiving the DM packet at the first cache line associated with the processor, the first cache line corresponding to a direct messaging transmit address at a memory;
   flushing the first cache line to the memory at the direct messaging transmit address using a host bus wherein the flushing is performed by the application running on the first processor;
   detecting said flushing by a network controller communicatively coupled to the host bus;
   storing the DM packet at a second cache line associated with the network controller, the second cache line also corresponding to the direct messaging transmit address at the memory; and
   sending the DM packet detected on the host bus over a network.

6. The method of claim 5, additionally comprising:
   receiving from the network a DM packet at a third cache line associated with the network controller, the third cache line corresponding to a direct messaging receive address at a memory;
   sending a bus invalidate command over the host bus;
   reading the memory at the direct messaging receive address;
   detecting said reading by the network controller; and
   storing the DM packet at a fourth cache line associated with the processor, the fourth cache line also corresponding to the direct messaging receive address at the memory.

7. The method of claim 6, additionally comprising fetching the DM packet by a receiving application.

8. An apparatus comprising:
   logic to:
   detect by a network controller a flush occurring on a host bus of a direct messaging (DM) packet to a memory from a first cache line associated with a first processor wherein the DM packet comprises an identifier configured to identify a packet as a DM packet and wherein the flush is performed by an application running on the first processor;
   obtain and store the DM packet at a second cache line associated with the network controller; and
   send the DM packet over a network to a third cache line associated with a second processor.

9. The apparatus of claim 8, additionally comprising logic to:
   receive a DM packet over the network at a fourth cache line associated with the network controller;
   detect by the network controller a read occurring on the host bus to the memory at an address corresponding to the fourth cache line; and
   in response to said detect logic, store the DM packet at a fifth cache line associated with the first processor.

10. The apparatus of claim 9, wherein the logic comprises logic to detect the read occurring on the host bus in response to the network controller sending a bus invalidate command.

11. A system comprising:
    a circuit board that includes a circuit card slot; and
    a circuit card that is capable of being coupled to the circuit board via the circuit card slot, the circuit card including logic of a network controller to:
    detect a flush occurring on a host bus of a direct messaging (DM) packet to a memory from a first cache line associated with a first processor wherein the DM packet comprises an identifier configured to identify a packet as a DM packet and wherein the flush is performed by an application running on the first processor;
    obtain and store the DM packet at a second cache line associated with the network controller; and
    send the DM packet over a network to a third cache line associated with a second processor.

12. The system of claim 11, additionally comprising logic to:
    receive a DM packet over the network at a fourth cache line associated with the network controller;
    detect by the network controller a read occurring on the host bus to the memory at an address corresponding to the fourth cache line; and
    in response to said detect logic, store the DM packet at a fifth cache line associated with the first processor.

13. The system of claim 12, wherein the logic comprises logic to detect the read occurring on the host bus in response to the network controller sending a bus invalidate command.

14. The system of claim 11, wherein the network controller complies with the MESI (Modified, Exclusive, Shared, Invalid) cache coherency protocol.

15. A system comprising:
    a processor configured to:
    generate a direct messaging (DM) packet wherein the DM packet comprises a packet identifier configured to identify a packet as a DM packet;
    provide the DM packet to a first cache line associated with the processor;
    receive the DM packet at the first cache line associated with the processor, the first cache line corresponding to a direct messaging transmit address at a memory; and flush the first cache line to the memory at the direct messaging transmit address using a host bus;
the host bus communicatively coupled to the processor; and
a NIC ("network interface card) communicatively coupled to the host bus and configured to:
detect said flushing;
store the DM packet at a second cache line associated with the network controller, the second cache line also corresponding to the direct messaging transmit address at the memory; and
send the DM packet detected on the host bus over a network.

16. The system of claim 15, additionally comprising:
the NIC further configured to:
receive from the network a DM packet at a third cache line associated with the network controller, the third cache line corresponding to a direct messaging receive address at a memory; and
send a bus invalidate command over the host bus;
a processor configured to additionally read the memory at the direct messaging receive address;
wherein the NIC:
detects said reading; and
stores the DM packet at a fourth cache line associated with the processor, the fourth cache line also corresponding to the direct messaging receive address at the memory.

17. The system of claim 16, additionally comprising the processor to fetch the DM packet on behalf of a receiving application.

18. An article comprising a machine-readable medium having machine-accessible instructions, the instructions when executed by a machine, result in the following:
generating a direct messaging (DM) packet wherein the DM packet comprises a packet identifier configured to identify a packet as a DM packet, placing the DM packet in a first cache line associated with a first processor and flushing the DM packet to a host memory wherein the generating, placing and flushing is performed by an application running on the first processor;
detecting by a network controller the flush occurring on a host bus, coupled to the first processor, of the DM packet to a host memory from the first cache line associated with the first processor;
obtaining and storing the DM packet at a second cache line associated with the network controller; and
sending the DM packet over a network to a third cache line associated with a second processor.

19. The article of claim 18, wherein the instructions additionally result in:
receiving a DM packet over the network at a fourth cache line associated with the network controller;
detecting by the network controller a read occurring on the host bus to the memory at an address corresponding to the fourth cache line; and
in response to said detect logic, storing the DM packet at a fifth cache line associated with the first processor.

20. The article of claim 19, wherein the instructions that result in detecting the read occurring on the host bus are executed in response to instructions that result in the network controller sending a bus invalidate command.

* * * * *

UNITED STATES PATENT AND TRADEMARK OFFICE
CERTIFICATE OF CORRECTION

PATENT NO. : 7,617,363 B2  Page 1 of 1
APPLICATION NO. : 11/236386
DATED : November 10, 2009
INVENTOR(S) : Chitlur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Fourteenth Day of December, 2010

David J. Kappos
*Director of the United States Patent and Trademark Office*